United States Patent [19]

Gambaretto

[11] Patent Number: 4,724,093
[45] Date of Patent: Feb. 9, 1988

[54] SOLID LUBRICANT AND PROCESS FOR PREPARING IT

[75] Inventor: Gian P. Gambaretto, Padua, Italy

[73] Assignee: Enichimica Secondaria, S.p.A., Palermo, Italy

[21] Appl. No.: 717,678

[22] Filed: Mar. 29, 1985

Related U.S. Application Data

[62] Division of Ser. No. 633,944, Jul. 24, 1984, Pat. No. 4,529,826.

[30] Foreign Application Priority Data

Jul. 28, 1983 [IT] Italy .............................. 22285 A/83
Jul. 28, 1983 [IT] Italy .............................. 22286 A/83

[51] Int. Cl.$^4$ ........................................ C10M 147/00
[52] U.S. Cl. ....................................................... 252/58
[58] Field of Search .................... 252/58; 570/140, 171

[56] References Cited

U.S. PATENT DOCUMENTS

| | | | |
|---|---|---|---|
| 2,510,112 | 6/1950 | Holbrook | 252/58 |
| 3,067,262 | 12/1962 | Brady | 252/58 |
| 3,129,254 | 4/1964 | Heine | 570/142 |
| 3,223,739 | 12/1965 | Teumac | 252/58 |
| 3,240,825 | 3/1966 | Hauptschein et al. | 252/58 |
| 3,345,424 | 10/1967 | Hauptschein et al. | 252/58 |
| 3,575,857 | 4/1971 | Goraver | 252/58 |
| 3,793,198 | 2/1974 | Chapman | 252/58 |
| 4,075,362 | 2/1978 | Concannon | 252/58 |
| 4,213,870 | 7/1980 | Loran | 252/58 |

FOREIGN PATENT DOCUMENTS 2018993 7/1985 Japan ............................... 252/58

Primary Examiner—William R. Dixon, Jr.
Assistant Examiner—Cynthia A. Prezlock
Attorney, Agent, or Firm—Hedman, Gibson, Costigan & Hoare

[57] ABSTRACT

A solid lubricant, consisting of solid perfluorocarbons, with linear or substantially linear carbon atoms chain, containing from 10 to 20 carbon atoms and having a value of surface tension ranging from 13 to 15 dyne/cm, is obtained by dimerization or co-dimerization of perfluorocarbonsulphonyl halogenides $$C_nF_{2n+1}SO_2X$$

(in which X represents an atom of halogen), having a linear or substantially linear chain of carbon atoms and bearing the —SO$_2$X group at one end of the chain, operating at high temperature, with short reaction times, and preferably in the presence of a metal catalyst.

The solid perfluorocarbon lubricant can be used, if desired as a mixture with paraffinic wax, on sliding surfaces, particularly consisting of a polymeric material either porous or made porous.

4 Claims, No Drawings

SOLID LUBRICANT AND PROCESS FOR PREPARING IT

This is a divisional of application Ser. No. 633,944, filed July 24, 1984, U.S. Pat. No. 4,529,826.

The present invention relates to a process for preparing a perfluorocarbon solid lubricant, having low values of the critical surface tension. The invention relates also to the solid lubricant thus obtained, to the compositions containing it, and to the use of the said lubricant and of the said compositions on sliding surfaces.

It is known in the art the use of solid perfluorocarbon polymers, as lubricating agents, provided with very high thermal resistance and high chemical inertness. Reference is made e.g. to Kirk-Othmer "Encyclopaedia of Chemical Technology", Ed. 1978, Vol. 1, Chapter "Abherents" and Lieng-Huang Lee, "Advances in Polymer Friction and Wear", Plenum Press, 1974, Chapter "Fluopolymer solid lubricants". Processes are still known from the art for preparing fluorocarbon polymers, suitable to be used as lubricating agents, essentially based on the oligomerization of unsaturated perfluorinated monomers, or on the degradation of perfluorinated polymers with high or relatively high molecular weight.

However, the products from the oligomerization do not appear as being completely satisfactory in the use as lubricant agents, mainly considering the rather high values of their critical surface tension, said values being related to the structure of the thus obtained oligomers. On the other hand the processes known for the breakdown of the fluorinated polymers cause mainly the formation of undesired liquid perfluorocarbons. On the other side, the obtaining does not seem to be possible, by means of the processes from the known art, in a simple suitable way, of solid perfluorocarbons having lower values of the critical surface tension than about 16 dyne/cm, which are highly desired for the use as lubricating agents.

The object of the present invention is overcoming the drawbacks of the known art above set forth.

More particularly the object of the present invention is a simple and suitable process for preparing a perfluorocarbon solid lubricant, having values of the critical surface tension ranging from 13 to 15 dyne/cm.

Other objects of the present invention are the said perfluorocarbon solid lubricant and the lubricant compositions which contain it together with paraffinic waxes.

A further object of the present invention is the use of said lubricant and of said lubricating compositions on sliding surfaces.

Other objects of the invention will become evident from the following disclosure.

In particular, according to the present invention, a solid lubricant is prepared, consisting of solid perfluorocarbons, with a linear or substantially linear carbon atom chain, containing from 10 to 20 carbon atoms and having values of the critical surface tension ranging from 13 to 15 dyne/cm, by means of the dimerization or the co-dimerization of perfluorocarbonsulphonyl halides

(in which X in an atom of halogen and especially fluorline and n is an even or lower than 10 number), with linear or substantially linear chain and bearing the —SO$_2$X group at one end of the chain, operating at a temperature within the range from 400° to 550° C. and for a time within the range from 1 to 30 seconds.

In the preferred embodiment of the present invention, the reaction is carried out in the presence of a catalytic metal, generally chosen among copper, nickel and chromium, the copper being preferred.

According to a practical way of operating, the reaction is performed in a tubular reaction vessel feeding the perfluorocarbonsulphonyl halogenises, as a gaseous stream, at one end of a tubular reaction vessel containing the catalytic metal, as a powder or pellets, in the form of a fixed bed.

In the present disclosure by the expression "linear or substantially linear carbon atom chain" with reference to the perfluorocarbonsulphonyl halogenides and to the perfluorocarbons, it is meant that the chains of carbon atoms of these compounds are linear to an extent of at least 90% to 100%.

The formation reaction of the solid perfluorocarbons, according to the present invention, can be schematically shown as follows:

Operating within the reaction conditions hereinbefore set forth, obtaining is possible a conversion of the reagents as high as 100%, with a yield of from about 40 to about 50% of solid perfluorocarbons containing from 10 to 20 carbon atoms in the molecule.

In the practice it has been found that using as the starting compound the perfluorooctanesulphonyl fluoride C$_8$F$_{17}$—SO$_2$F and operating with short reaction times, of the magnitude of the seconds, a mixture is mainly obtained containing a fair percentage of solid perfluorocarbons of from 10 to 16 carbon atoms. If the same reaction is carried out in a tubular reaction vessel filled with a metal such as copper, zinc or nickel, as chips, pellets and similar, operating is possible at lower temperatures and with shorter contact times, still substantially the same conversion rates and the same yields being obtained.

So, e.g., the reaction of C$_8$F$_{17}$—SO$_2$F on chips of copper, allows high conversion rates to be obtained, of the order of 97–98%, at 550° C., with contact times of the order of 1–2 seconds; the same conversion rates can be obtained by operating at about 500° C., with longer contact times, e.g. of 4 seconds. The most favourable conditions for the production of perfluorocarbons with 10 or more carbon atoms are achieved at a temperature of about 460° C. and with a contact time of the order of 8 to 10 seconds.

In any case in the reaction products are developed as highly volatile, as SO$_2$ and SO$_2$F$_2$, which can be easily withdrawn from the reaction mixture. Moreover, near the main reaction effected under the operating conditions of temperature and times above shown, also the cleavage of the radical C$_8$H$_{17}$ can take place and it results therefore possible to obtain a full range of mixtures of perfluorinated products, mainly ranging from C$_8$F$_{18}$ to C$_{16}$F$_{34}$.

It has been found in particular that by operating at the lowest values of the temperature range, e.g. around 460° C. and with contact times of the order of 8–10 seconds, the breakdown takes place mainly of the C-S bond with the consequent formation of molecules arising from the dimerization of the radical C$_8$F$_{17}$ initially present. Operating at higher temperatures the possibility increases of the breakdown of the C-C bonds too, so that a large range of perfluorocarbons can be obtained, such as e.g.

$$C_8F_{17} \rightarrow C_6F_{13} + CF_2 = CF_2$$

from which $$C_6F_{13} + C_8F_{17} \rightarrow C_{14}F_{30}$$

In particular, when using the perfluorooctanesulphonyl fluoride $C_8F_{17}$—$SO_2F$, which is obtained e.g. by electrochemical fluorination according to the well known Simons process, a mixture can be obtained of solid perfluorocarbons containing $C_{10}F_{22}$, which melts at 36° C.; $C_{13}F_{28}$, which melts at 70° C., and $C_{16}F_{34}$, melting at 108°-110° C.

From the foregoing, the identification results to be possible of the most suitable operating conditions, as for the reaction times and temperature, for orienting the reaction towards the formation of prevailingly light or prevailingly heavy perfluorocarbons, in view of the needs and requirements of use.

Moreover, according to the invention, mixtures can be used of perfluorocarbonsulphonyl halides, as starting materials, e.g. mixtures consisting of $C_8F_{17}SO_2F$ and another perfluorocarbonsulphonyl fluoride, obtaining in this case solid perfluorocarbons with a composition depending on the starting materials used. So e.g., when using a mixture of $C_8F_{17}SO_2F$ and $C_6F_{13}SO_2F$, a high concentration is obtained of $C_{14}F_{30}$ in the products from the reaction, whilst when using a mixture of $C_8F_{17}SO_2F$ and $C_4F_9SO_2F$, a high concentration is obtained of $C_{12}F_{26}$.

All these perfluorocarbons and their mixtures are characterized by low values of the dielectric constant and by very low values of the critical surface tension, within the range from 13 to 15 dyne/cm; these are therefore materials with low friction coefficient and high water and oil repellent properties, being particularly suitable to the purpose of increasing the sliding characteristics of the sliding surfaces.

It is well known that the sliding activity of the sliding surfaces, with special reference to those formed by polymeric materials such as polyethylene, glass filled resins, paints and coating materials and similar products, depend not only on the chemical nature but also on the structure of the surface itself, mainly on its receptivity for the paraffinic waxes, which are solid lubricating products, normally applied on the said surfaces at high temperature, and whose characteristics are varied according to the varying characteristics of the sliding means.

The presently more diffused lubricating compounds consist of solid products on the base of paraffinic waxes of the type $C_xH_{2x+2}$, in which x is a number ranging from 14 to 30. These compounds, thanks to their low molecular weight and to their linear chain structure similar to that, e.g., of the polyethylene, are easily adsorbed by the sliding surface. Essentially these known lubricants have the purpose of reducing the friction coefficient of the surface and therefore of increasing its slippery properties, as well as of at least partly restoring a superficial homogeneity of the surface itself, without which good sliding properties would not be obtained. In addition, in order to keeping the sliding properties as constant as possible during the time, for instance of the surfaces consisting of high molecular weight polyethylene, trials have been carried out in order to increasing their attitude to be impregnated by the paraffinic waxes by means of mechanical ways, e.g. by creating a diffuse porosity in the material which forms the sliding surfaces.

However some negative characteristics of the paraffinic waxes presently used as lubricants, such as their reduced chemical stability especially at the high temperatures to be found in the application step, and their easy getting dirty render difficult the after use cleaning operations of the surfaces and reduce appreciably their sliding characteristics during the time. Moreover the paraffinic waxes, owing to their chemical structure, can undergo at ageing oxidation processes from which a worsening of their surface tension can derive and hence of their sliding characteristics or slipperiness. Finally the paraffins used e.g. in the ski waxes have very variable physical characteristics with the temperature, so that it is necessary to resort to different types of paraffins, according to the different snow temperatures, resulting from variations of the atmospheric conditions, also during the same day.

The solid perfluorocarbons according to the present invention are able, thanks to their reduced friction coefficient, high chemical inertness and water-oil-repellent characteristics, so notably increase the sliding characteristics of any sliding surfaces, such as those of boat bodies, sledges, ski soles and so on, thus eliminating all the drawbacks shown by the lubricants known and used to the same purposes.

The present invention therefore relates also to a solid lubricant, consisting of solid perfluorocarbons, with linear or substantially linear chain, containing from 10 to 20 carbon atoms, and preferably from 12 to 16 carbon atoms, with a melting point ranging from 50° to b 130° C. and with critical surface tension ranging from 13 to 15 dyne/cm.

A surprising feature of such solid lubricant is that it maintains its critical surface tension always at very low values (from 13 to 15 dyne/cm) upon variations of the composition and therefore upon variations of the melting point, of course within the ranges of values above set forth. This in the practice allows preparing mixtures of perfluorocarbons with different average numbers of carbon atoms, with the same chemical and high stability characteristics, but with different melting points, thus allowing using the lubricant in the best way, under the different operating conditions.

In the attached Table 1 toether with the experimental Examples, three fraction of solid perfluorocarbons are shown, with different average number of carbon atoms, for which it appears clearly that when varying the length of the chain, in the range from $C_{10}$ to $C_{18}$, the melting point varies of the fractions, whilst, for all the fractions, the values remain substantially unaltered of the critical surface tension and of the friction coefficient.

The solid lubricant according to the present invention has, as it has previously been described, a critical surface tension of 13–15 dyne/cm, compared e.g. to the values of 28–30 dyne/cm of known solid lubricants, consisting of normal paraffins and a friction coefficient of the order of 0,19–0,20 (evaluated following ASTM 1894/63), against e.g. the value of 0,30 of the ski waxes consisting of normal paraffins (always measured according to the same method).

It has also been ascertained that the solid lubricant according to the present invention exhibits the highest degree of sliding characteristics or slipperiness on surfaces of any polymeric material, or similar materials, provided these surfaces, on which the lubricant itself is applied, be porous, or be mechanically rendered porous, being preferably reticulated and/or sintered surfaces; the lubricant can indeed be thus mechanically adsorbed within the pores of the surface and remain firmly fixed thereto, the polymeric surface remaining unaltered in that the perfluorocarbons are insoluble in the polymeric and similar materials.

The lubricant according to the present invention is therefore more efficaciously used in applications on boat bodies, slipways, sledges and ski soles, to which it confers slipperiness and hence speed increases, in comparison to the lubricants and ski waxes known based on paraffinic waxes.

Moreover, as the fluorocarbons, due to their chemical structure, do not undergo oxidation and ageing phenomena, they offer the advantage of maintaining unaltered during the time and during their use, their initial characteristics. As then the physical properties of the perfluorocarbons are substantial unchanged with temperature, with respect to the normal paraffins, their use results to be more flexible versus the variations of the atmospheric conditions and of the temperature of the medium the sliding surfaces are intended to remain in contact with.

In addition to what has hereinbefore specified, the property of oil-water-repellency prevents the dirt from adhering to and being retained on the sliding surfaces treated with the said perfluorocarbons.

The perfluorocarbon lubricant of the present invention can be used mixed with normal, non-fluorinated lubricants, such as ski waxes based on normal paraffins, to the purpose of increasing the sliding and resistance characteristics of the latter.

Therefore according to another object the present invention relates to a lubricant composition in the solid state consisting of the perfluorocarbon lubricant above described and of normal paraffinic waxes.

In the preparation of this lubricant composition the perfluorocarbons can be dissolved in the normal paraffinic waxes by means of the use of suitable surfactant agents, such as e.g. the compound

and other similar compounds.

Obviously in the practice the lubricant and the lubricant composition according to the present invention can be advantageously used on all the sliding surfaces applied to or existing on any sliding means or vehicles on water, snow, ice or similar media, their use allowing in any way a conclusive increase of the characteristics of slipperiness and of oil-water-repellency of the sliding surfaces onto they have been applied.

The following examples, which have been reported for the purposes of illustration and not limitation, will allow a better comprehension of the purposes and the advantages of the invention.

EXAMPLE 1

In a tubular oven having an inner diameter of 2.5 cm and 60 cm long, maintained at the temperature of 460° C. along a section 30 cm long, and filled with copper chips, are passed, with a 10 seconds contact time, 1,004 g of $C_8F_{17}SO_2F$.

The feeding as a liquid phase was carried out by a metering pump and the liquid was vapourized directly at the inlet of the tubular reactor.

The outcoming vapours were cooled in two flasks in series, cooled from the outside by water and ice; the passing forward gases were washed with a 10% solution of NaOH and those passing still forward, consisting of low boiling point perfluorocarbons (lower than $C_6$) were metered by a volumetric meter and then condensed with liquid nitrogen.

The fractions collected in the first two flasks have been collected together; the resulting fraction consisted of 720 g of a semi-thick product, which has been separated by distillation (up to reaching the temperature of 195° C. in the boiler) into two fractions:

the first, of 310 g with boiling range of 100°-190° C., consisted of a mixture of perfluorocarbons with prevailing $C_8$ and $C_{13}$;

the residuary fraction in the boiler, 410 g, consisted of a solid product, with melting range 100°-102° C., constituting the so called "perfluoroparaffins", mainly consisting of $C_{13}-C_{16}$ hydrocarbons.

What is claimed is:

1. A solid lubricant consisting of solid perfluorocarbons prepared by dimerization or co-dimerization of linear or substantially linear perfluorocarbonsulphonyl halides of the formula $C_nF_{2n+1}-SO_2X$, wherein X is halogen and n is a number less than or equal to 10, said solid perfluorocarbons having linear or substantially linear chains, with a number of carbon atoms ranging from 10 to 20, a melting point ranging from 50° to 130° C., and a critical surface tension ranging from 13 to 15 dyne/cm, which solid prefluorocarbons are dissolved in paraffinic waxes by means of a surfactant of the formula $C_8F_{17}-CH=CH-(CH_2)_5-CH_3$.

2. Method for lubricating sliding surfaces, characterized in that a solid lubricant composition consisting of solid perfluorocarbons prepared by dimerization or co-dimerization of linear or substantially linear perfluorocarbonsulphonyl halides of the formula $C_nF_{2n+1}-SO_2X$, wherein X is halogen and n is a number less than or equal 10, said solid perfluorocarbons having linear or substantially linear chains, with a number of carbon atoms ranging from 10 to 20, a melting point ranging from 50° to 130° C., and a critical surface tension rannging from 13 to 15 dyne/cm dissolved in paraffinic waxes by means of a surfactant of the formula $C_8F_{17}-CH=CH-(CH_2)_5-CH_3$ is applied to the surfaces.

3. Method as claimed in claim 2, characterized in that the surfaces are surfaces of porous or made porous polymeric material.

4. Method as claimed in claim 2, characterized in that the surfaces are surfaces of skis, sledges, slipways or boats.

* * * * *